United States Patent [19]

Newcombe et al.

[11] Patent Number: 4,889,162
[45] Date of Patent: Dec. 26, 1989

[54] FLUID CONTROL VALVE

[75] Inventors: Haydn J. Newcombe, Wolverhampton; John Hird, Shipley, both of England

[73] Assignee: Armitage Shanks Limited, Rugeley, England

[21] Appl. No.: 241,106

[22] Filed: Sep. 2, 1988

[30] Foreign Application Priority Data

Sep. 9, 1987 [GB] United Kingdom ............... 8721144

[51] Int. Cl.⁴ .................. F16K 5/14; F16K 11/22
[52] U.S. Cl. ................. 137/606; 137/625.31; 251/175; 251/185
[58] Field of Search ............. 137/606, 625.3, 625.31; 251/175, 185, 192

[56] References Cited

U.S. PATENT DOCUMENTS

| | | | |
|---|---|---|---|
| 924,861 | 6/1909 | Ward | 251/185 |
| 3,967,811 | 7/1976 | Keller | 251/175 |
| 4,074,697 | 2/1978 | Saether | 137/606 |
| 4,126,296 | 11/1978 | Skor et al. | 251/185 X |
| 4,331,176 | 5/1982 | Parkison | 137/625.31 X |
| 4,360,040 | 11/1982 | Cove et al. | 137/625.3 |
| 4,573,493 | 4/1986 | Hammarstedt | 137/606 X |

Primary Examiner—Stephen M. Hepperle
Attorney, Agent, or Firm—Sheldon & Mak

[57] ABSTRACT

A water tap has a closure member in the form of a rubber or like cup 34 located in a chamber in carrier 32. The base of the cup extends across the port 28 which is to be closed when the tap is in "off" condition and the base of the cup has a hole 38 registered with the port in that off condition. Hence water can flow into the cup and the water pressure in the cup acts to hold the cup on the seat whereas pressure in the port acts against the base of the cup in the opposite direction but on a smaller area of cup. Hence the higher the water pressure the better the seal.

2 Claims, 3 Drawing Sheets

FLUID CONTROL VALVE

This invention relates to fluid control valves and particularly, but not exclusively water taps of the kind known as bath fillers, basin mixers and the like, in which hot and cold water supplies are channelled through generally parallel passages under the control of individual valves for discharge from a common spout. Often, the valves concerned are primarily intended to have an on/off control and in this case, it is conventional to provide a control member which is angularly movable for a small degree, for example say 90 degrees, between the on and off positions.

The object of the invention is to provide an improved construction suitable, inter alia, for such valves.

According to the invention, a fluid flow control valve comprises a valve seat, a supply passage opening through said seat, a closure member movable relative to the seat to obturate or free the seat, the closure member having a chamber containing a disc-like element which is for contact with the seat about the opening, and the said element having a port therethrough which establishes communication from the passage to the face of the disc remote from the passage when the disc obturates the passage, the effective cross sectional area of the said disc face remote from the passage being greater than that of the passage within said seat.

Hence, water pressure (for example) in the passage is communicated through the port and acts on the disc so as to hold the disc against the valve seat and hence maintain the valve in an off condition as regards flow from the passage through the seat. It will be appreciated that there must be no flow from the said remote face of the disc in order for the valve to work. To this end, the disc is preferably made as part of a cup-like construction and the wall of the cup is in sealing contact with the wall of the chamber, for example due to the hydraulic pressure also acting on the wall of the cup.

The sealing effect increases with pressure in the supply passage. Hence a valve of this kind does not leak if pressure is increased (within the working limits of the materials used) but on the contrary they tend to leak if the pressure falls below a certain minimum.

According to a preferred feature of the invention, the disc is lightly urged against the seat, for example by a compression spring. Preferably (in any event) the disc is made of an elastomeric material, and conveniently it is made as a cup-like part with a convoluted side wall allowing it to be axially compressed when assembled, and to then extend due to the elastomeric material so as to be urged into sealing contact with the seat by the nature of the material itself.

Conveniently the supply passage has a pair of seats arranged side-by-side, and a pair of valve members are located on a common carrier arranged to be turned at an axis lying between the two seats. This enables the discs to be turned through 90 degrees, so that the carrier member provides minimum impediment to flow through the seat and onward through the valve.

One presently preferred embodiment of the invention will now be more particularly described with reference to the accompanying drawings wherein.

Figure 4:
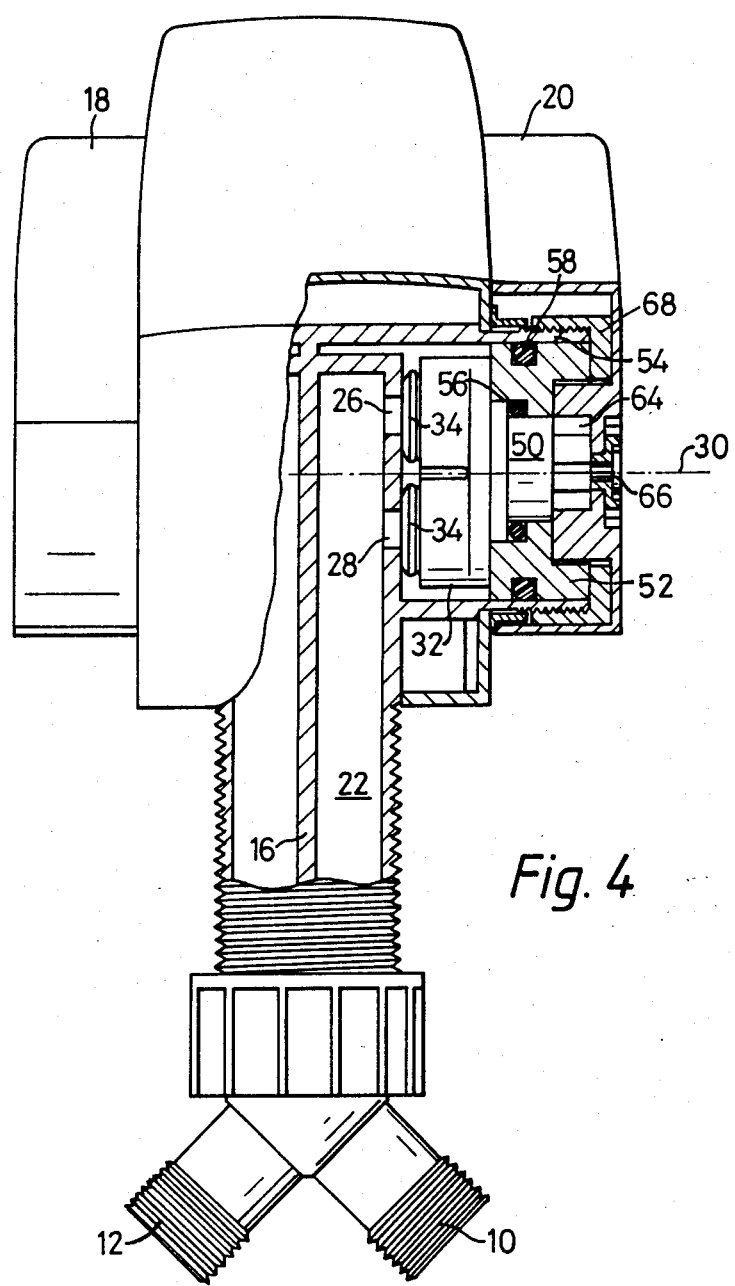
FIG. 4 is a section taken on the line 4—4 of FIG. 3.

Referring to the drawings, the tap shown has separate hot and cold water ways via inlet passages 10, 12 (FIG. 4) and the flows are kept apart by a central divider 16. The valve arrangements for each water passage are generally similar having individual control levers 18, 20, and only that for the passage 10 and lever 20 will be further described.

The waterway 22 (FIG. 4) terminates in a pair of passages 26, 28 (FIG. 1) opening through a planar face, and spaced apart at a common distance about axis 30. Carrier member 32 has a pair of like chambers each housing a cup-like elastomeric valve member 34 for closing a corresponding one of the ports 26, 28. These rubber or like cup-like members 34 have external peripheral ribs 36 to improve sealing contact with the walls of the respective chambers, and a central port 38 in the base of each cup, aligned with the ports 26, 28 (in the FIG. 1) position. A light compression spring 40 in each chamber urges the corresponding valve into the sealing position.

According to the invention, the cross sectional area of each port 26, 28 is less than the cross sectional area of the interior of the cup-like members. Hence water pressure in the passage 22 communicated through the ports 38 acts on the interior of the face of the cup over a larger area and is acted upon by the same pressure within the port 26, 28. Hence the higher the water pressure, the more firmly is the cup pressed onto the seat. In the event of low water pressure, the spring 40 holds the valve on the seat sufficiently to prevent flow through the valve.

Figure 1:
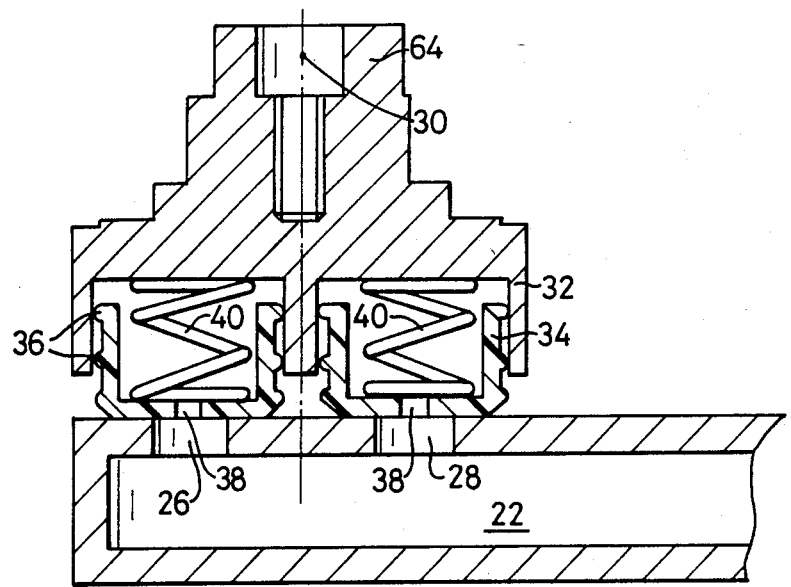
FIG. 1 is a fragmentary sectional elevation showing the flow control valve.
Figure 2:
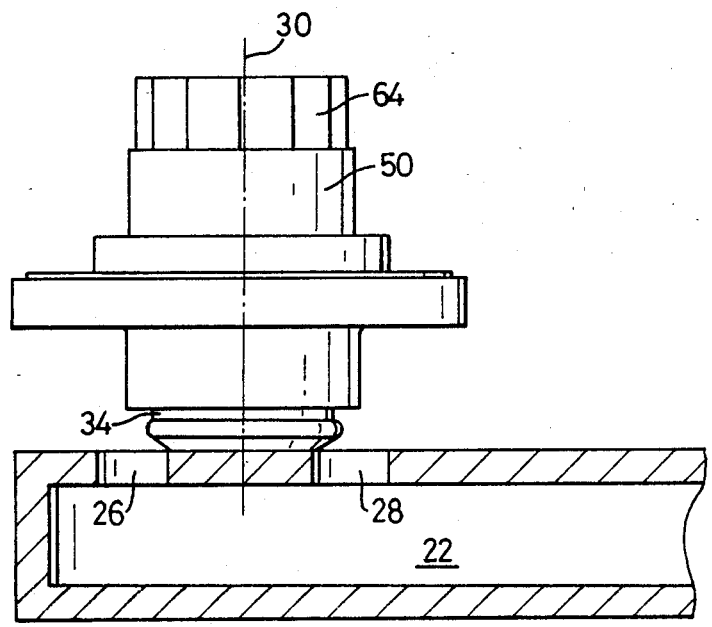
FIG. 2 is a view similar to FIG. 1 but showing the valve in an open condition.

In the illustrated embodiment the movement of the valve from the FIG. 1 (closed) position to the FIG. 2 (open) position is a purely angular movement, so that the rubber or like cups slide over the surface surrounding the ports 26, 28. However it would be within the scope of the invention to use a screw thread arrangement so that the cups were also lifted slightly relative to said surface.

Figure 3:
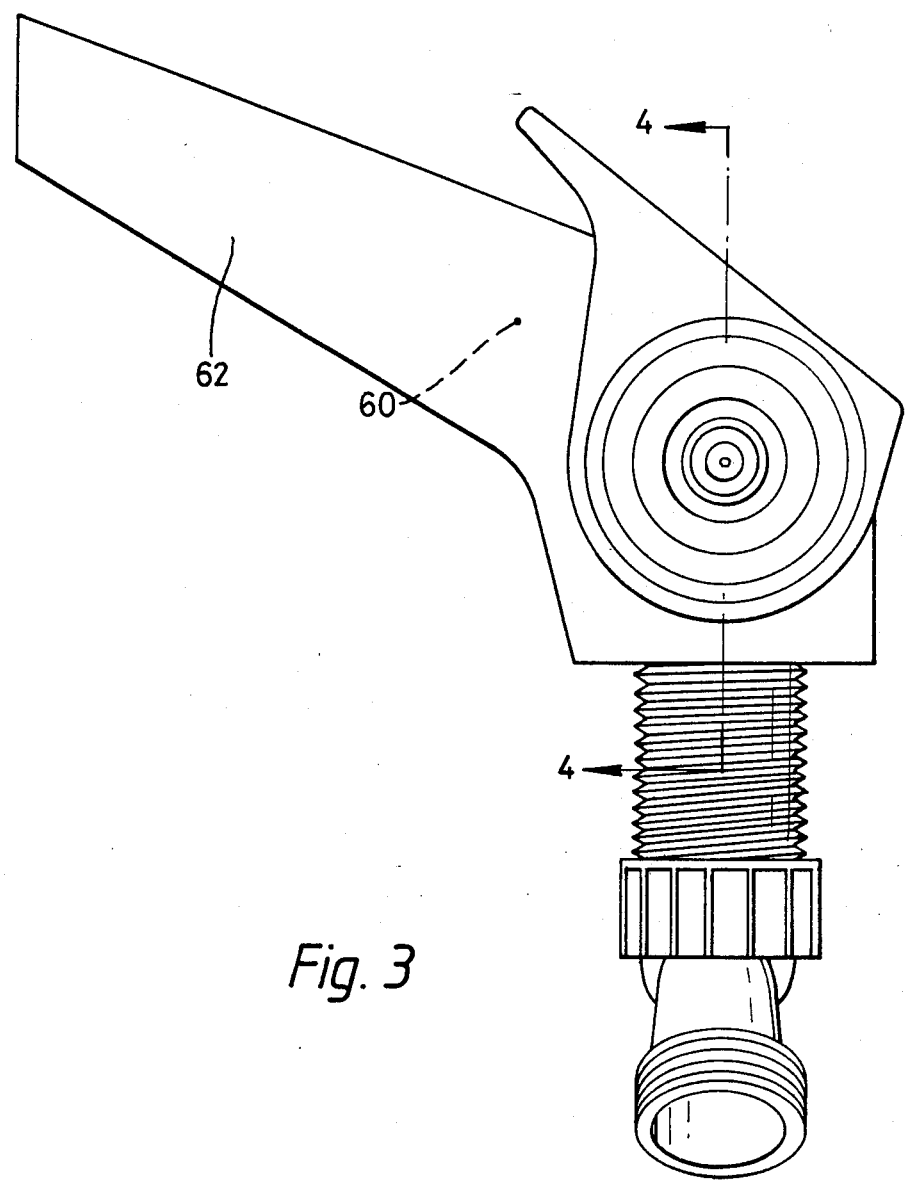
FIG. 3 is a side view of a complete sink mixing tap.

In the illustrated arrangement, the carrier 32 is provided with a boss 50 which is effectively journalled in a ring 52 (FIG. 4) which is itself a push-fit into a tubular extension 54 from the body of the valve. The ring 52 may, as illustrated, have O rings 56, 58 at its internal and external peripheries to seal the space surrounding the carrier, which opens in the vicinity of the point 60 to the outlet spout 62 (FIG. 3).

The boss 30 is provided with a projecting end 64 of non-circular cross section, which is keyed to the interior of the tap lever 20 and possibly held in place by a central screw 66.

The ring 52 is held in place by a cap 68 screwthreadedly engaged with the exterior of the part 54.

We claim:

1. A fluid flow control valve comprising a conduit for the fluid; a planar face formed on the conduit; a carrier member journalled for angular movement about an axis, the axis being perpendicular to and intersecting the planar face; a pair of passages opening through the planar face for flow of fluid from the conduit to the passages, the passages being equispaced about the axis; the carrier member having a pair of chambers, each chamber having a cup-shaped elastomeric valve member with a base located therein; a spring in each chamber acting on the base of the corresponding valve member to urge the same against said planar face, each cup-shaped elastomeric valve member having a plurality of peripheral sealing ribs making contact with the respective chamber around the periphery of the cup-shaped member, and each cup-shaped member base being larger than the passage and having a port therethrough which is smaller than the passage so that when the chambers and passages are axially aligned, fluid pressure acting on the inside surface of the cup-shaped member to urge the same against the planar face acts over an area larger than that subject to pressure in the opposite direction from fluid in the passage; and means for turning the carrier member to displace the cups away from the passages and allow flow therethrough.

2. A valve as recited in claim 1 arranged so as to supply both hot and cold water through respective waterways in a common outlet spout, wherein there are two sets of carrier members as a faucet at opposite ends of a common axis of movement and further comprising levers at each end of said axis.

* * * * *